J. F. KEHRMAN.
RAILWAY MOTOR CAR.
APPLICATION FILED MAY 19, 1919.

1,401,607.

Patented Dec. 27, 1921.
8 SHEETS—SHEET 5.

INVENTOR
John F. Kehrman

BY
John C. Higdon
ATTORNEY.

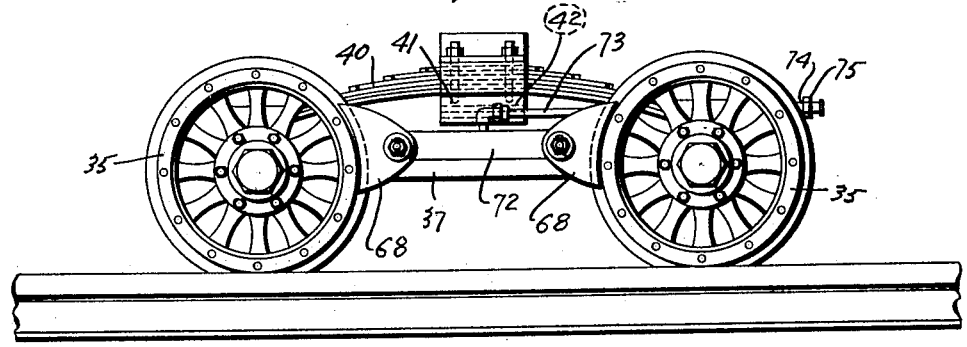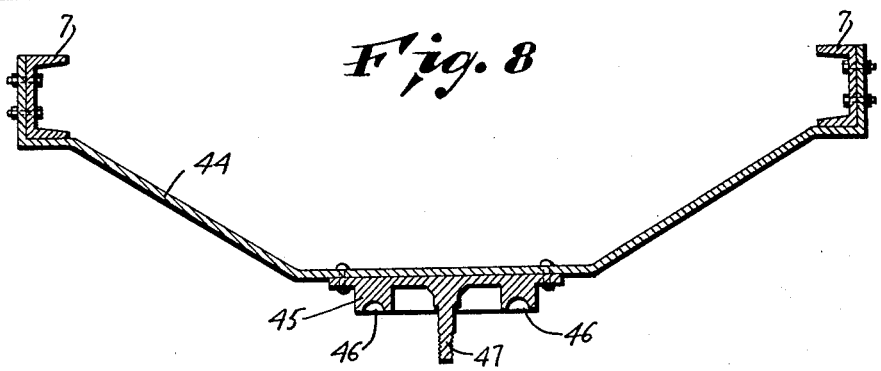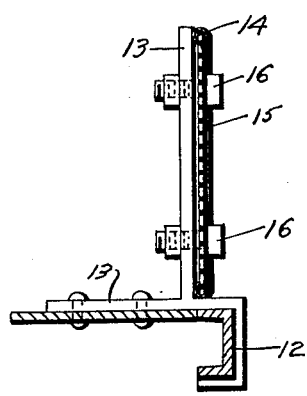

J. F. KEHRMAN.
RAILWAY MOTOR CAR.
APPLICATION FILED MAY 19, 1919.

1,401,607.

Patented Dec. 27, 1921.
8 SHEETS—SHEET 7.

INVENTOR
John F. Kehrman

BY
John C. Higdon
ATTORNEY.

J. F. KEHRMAN.
RAILWAY MOTOR CAR.
APPLICATION FILED MAY 19, 1919.
1,401,607.
Patented Dec. 27, 1921.
8 SHEETS—SHEET 8.
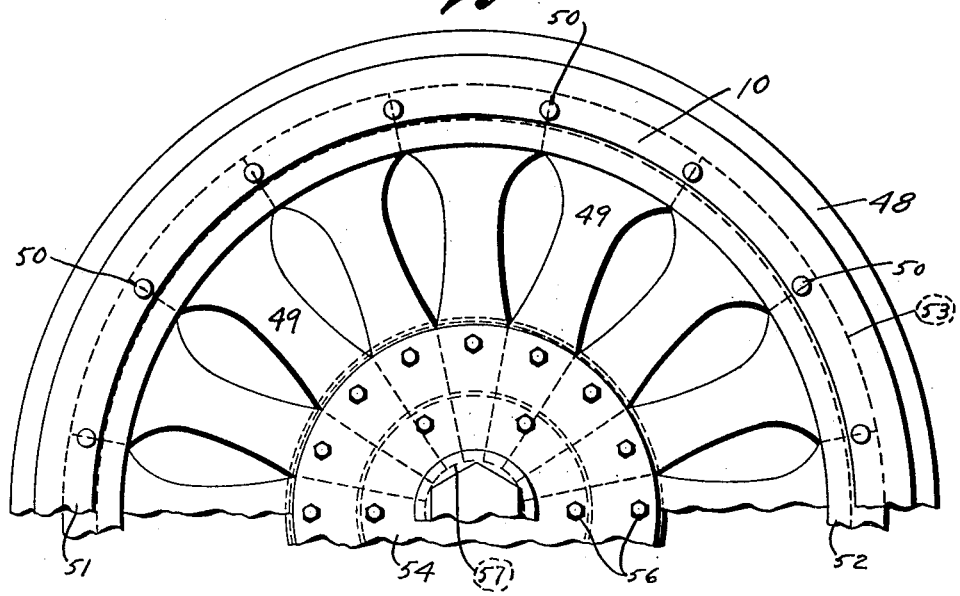
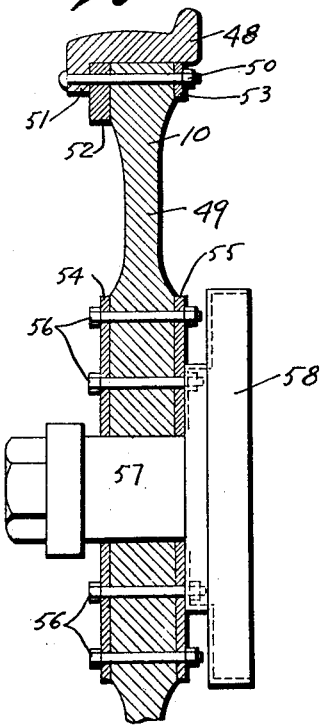
INVENTOR
John F. Kehrman
BY
John C. Higdon
ATTORNEY.

UNITED STATES PATENT OFFICE.

JOHN F. KEHRMAN, OF BONNE TERRE, MISSOURI.

RAILWAY MOTOR-CAR.

1,401,607.	Specification of Letters Patent.	Patented Dec. 27, 1921.

Application filed May 19, 1919. Serial No. 298,166.

*To all whom it may concern:*

Be it known that I, JOHN F. KEHRMAN, a citizen of the United States, residing at the city of Bonne Terre, in the county of St. Francois and State of Missouri, have invented certain new and useful Improvements in Railway Motor-Cars, of which the following is a specification containing a full, clear, and exact description, reference being had to the accompanying drawings, forming a part hereof.

My invention relates to railway motor-cars, and it consists in the novel disclosure hereinafter particularly described and claimed.

The object of my invention is to provide an improved method of and means for converting an ordinary automobile into a railway motor-car, or for building the latter outright from new materials, and providing the same with a front four-wheel truck.

A further object is to provide such a car with power and hand-brakes on all wheels, and also to provide the wheels with sanders.

A further object is to provide such car with an air-pump driven by the engine crank-shaft, either direct, or by means of a sprocket-chain or suitable gearing, for operating the air-brakes, blowing a whistle, and operating the sanders.

A further object is to provide a railway motor-car that can be readily used for inspecting purposes, or arranged inside as a business car, or as a sleeping car, whereby it may take the place of steam locomotives and crews on branch lines of steam railways that are not operating at a profit.

In the drawings,

Fig. 7 is a side elevation of the truck shown in Fig. 5.

Fig. 8 is a detail section of the body bolster, having the center bearing attached thereto.

Fig. 9 is a detail view of an insect screen and one of its supporting brackets.

Fig. 12 is a fragmentary side elevation of one of the motor drive-wheels, and

Fig. 13 is a vertical cross-section of the drive-wheel shown in Fig. 12.

*General description.*

Figure 1:
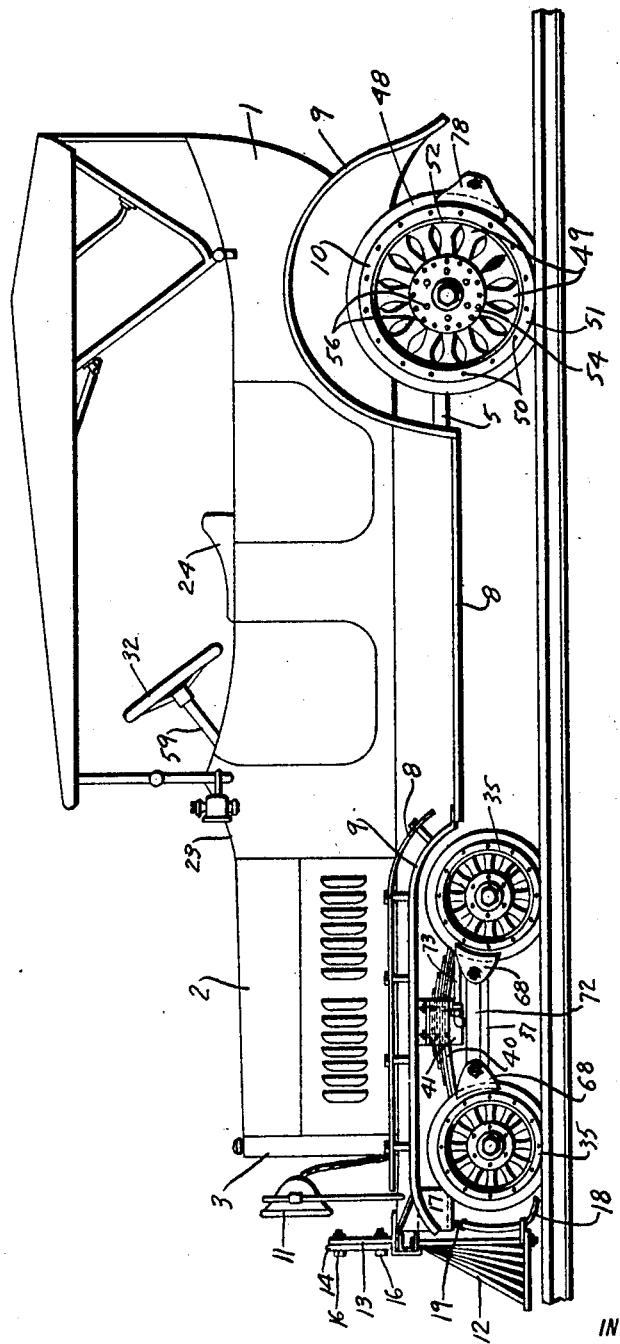
Figure 1 is the side elevation of a converted motor-car constructed in accordance with my invention.

In carrying out my invention, as illustrated in the present drawings, I have converted an ordinary automobile into a railway motor-car, but I wish to be plainly understood that I do not limit myself to this method or means, as every part of the car may be manufactured and assembled for use solely in a railway motor-car.

In the present illustration of my invention, the numeral 1 designates the body of the car, which may be of any ordinary form supported upon the usual chassis having the usual gasolene engine beneath its hood 2, cooled by the customary radiator 3.

The power of the engine is communicated to the rear axle 4 in the present case by the ordinary drive-shaft inclosed in the usual drive-shaft tube 5, there being the usual differential gear mounted in the rear axle housing 6.

The numeral 7 designates the chassis or frame of the car; 8 the running boards at the sides of the car; 9 the mud guards.

In the present case, the car is driven solely by the rear wheels 10, which may be of any desired construction and fixed upon the axle in the usual manner.

Hereinafter I will describe and claim an improved form of a drive-wheel. At the front end of the car are the usual head-lights 11. Suitable tail lights and other signals may, of course be provided.

An ordinary pilot, or cow-catcher 12 is arranged at the front end of the car for an obvious purpose. Mounted on the horizontal buffer beam of the pilot by means of suitable brackets 13 is an insect-screen 14, composed of a suitable frame of rectangular form, in which is stretched ordinary wire netting 15, of sufficiently fine mesh to prevent the passage of grasshoppers and other insects which might strike the radiator 3, and obstruct the passage of air therethrough and cause over-heating of the engine.

Said insect screen in the present case, is extended sufficiently high to protect only the lower half of the said radiator, but it is obvious that if necessary, the height of the screen may be extended to protect the entire cooling surface of the radiator.

Suitable bolts 16 connect the screen to the said brackets 13.

A sand box 17 is mounted in front and above the front wheels of the car, and provided with an ordinary sand pipe 18, for discharging sand upon the rails in front of said wheels, and for a purpose which is obvious to railroad men.

A common air sander 19, is fitted to the bottom of said sand box 17, and said sander is supplied with air from the air-tanks or reservoirs 20, carried by the car under the foot-board 8.

A suitable pipe 21 leads from said sander to the said tank in the usual manner, and is controlled by a sander-valve 22, located upon the cowl 23 in front of the driver's seat 24.

A common pressure-gage 25 is also located on the said cowl and connected to the said reservoirs 20 by means of a pipe 26, for the purpose of indicating the pressure of air in said reservoirs.

A common speedometer 27 is also located on said cowl and connected to one of the front wheels of the car in the usual manner.

Other instruments that are common in automobiles are also located on the said cowl 23, but need not be further referred to.

The usual speed-change lever 28, emergency brake-lever 29, clutch-pedal 30 and brake-pedal 31 are arranged as usual, convenient for the operator.

The usual steering-wheel 32 is mounted upon the customary steering-post, but is used as a hand-brake wheel in the manner hereinafter explained. The usual throttle-lever 33, and spark-lever 34, are mounted in the customary way above said wheel 32, to control the power of the engine or motor which propels the car. Said motor being of the combustion type, is of course, provided with the usual carbureter and other appliances for operation with gasolene or other liquid fuel.

*The front four-wheel truck.*

One of the most important parts of my invention is the front four-wheel truck, which will now be described in detail.

In the present case, the said truck is provided with four wheels 35, which may be of any common construction and provided with flanged tires to run upon the ordinary railway rails.

Said wheels 35 are loose upon their axles 36, to prevent slipping and consequent friction and wear upon the rails in rounding short curves, and thereby avoid these evils which are an inherent defect in pairs of wheels which are fixed upon their axles.

These defects are well known and need not be further referred to.

However, I do not limit myself to a front truck in which the wheels are loose upon the axles, as it is obvious that the wheels may be fixed upon the axles to rotate therewith, which has been and is now, the present practice in the railway art.

Nor do I limit myself to a four-wheel front truck, as it is obvious that a two-wheel truck may be employed, provided it is pivotally connected to the front end of the car, as for instance, the well known Bissell or pony truck is connected to the front end of a locomotive. I have discovered, after long experimentation, that a truck pivotally connected to the front end of a railway motor-car possesses many advantages over the rigid wheels heretofore in use upon such cars. The advantages of a front truck, pivotally connected to the frame of a motor-car, are as follows:—

1. It usually carries the weight of the front end of the car, and also guides it into and around curves and switches.

2. It does it very much in the same way as the front wheels of an ordinary wagon enable it to turn around corners—that is, the truck wheels are attached to a separate frame, which is connected to the car by a center-pin, so that they can turn just as the front axle of an ordinary wagon can which is connected to the body by a king-bolt.

In the present form of the truck, its frame consists of a series of parallel bars 37, having their ends connected to the two axles 36, for the purpose of spacing said axles apart; cross-bars 38, having their ends connected to said axles by any common means for the purpose of holding the frame in a rigid rectangular shape; spring seat 39 fixed upon the outer portions of said axles, two parallel semi-elliptic springs 40, with their ends engaging said spring seats; and a truck bolster 41, carrying the lower half 42 of a ball center bearing, is mounted upon said springs mid-way the length of the latter.

Common truss-rods 43 are used for strengthening the said axles 36. A body-bolster 44 has the upper member 45 of a ball center bearing attached to its under side, and the sills of the chassis 7 are mounted upon the outer ends of said body-bolster. (See Fig. 8).

Ball races 46 are formed in the opposing faces of the said upper and lower members of the said ball center bearings to receive common anti-friction balls; the upper 45 of the center bearings carries a king-bolt 47, which connects the said upper and lower members of the center bearing, by having a nut threaded upon its lower entrance in the usual manner.

The drive wheels.

In the present illustration, I have shown the car driven solely by the two rear drive-wheels 10.

However, it is obvious that the front truck-wheels may also be used as drive-wheels, by fixing them upon their axles, making said axles revoluble, fixing a sprocket-wheel or a bevel-gear wheel on each of the axles 36, connecting said gear wheels by a suitable chain or shaft and pinions, and driving the rear one of said axles 36 by a shaft and bevel-gear connection with the rear axle.

My special drive-wheels are shown in detail in Figs. 12 and 13, in which a flanged steel tire 48 rests directly in contact with the outer ends of spokes 49, to which the tire is secured by tie-bolts 50 passing through registering apertures.

An inner flange 51 on said tire, outer and inner rings 52 and 53 respectively, and the said spokes, the latter being clamped rigidly between the said rings 52 and 53, the inner ends of said spokes are clamped between hub-plates 54 and 55 by means of bolts 56 passing through registering apertures in said plates and in said spokes. The hubs 57 carry at their inner ends the usual brake-drums 58 for the usual purpose in automobile construction, the said hubs being fixed upon the outer ends of the automobile rear axle in the usual manner.

The brakes.

The automobile portion of my motor-car is, of course, provided with the usual service and emergency brakes that are ordinarily used upon automobiles, but in addition to these I have provided air-brakes and hand-brakes which may be operated either when the car is running or standing still.

In railway operation, it is important to "set" the brakes in order to hold the car on down grades, as long as it stands at rest, no matter how long that may be.

The air-brakes cannot be depended upon for holding the car on a grade at rest for a long period of time because the air in the brake-cylinders leaks out and releases the brakes.

Therefore, I have converted the usual steering wheel of the automobile into a hand-brake-wheel and have connected said wheel to the brakes in the manner which will now be described in detail.

Hereinafter I will refer to the said wheel 32 as the brake-wheel.

Said wheel 32 is mounted as usual upon the upper end of a stering-wheel shaft, which I herein name the brake-staff 59, and said staff is mounted in the usual tubular steering-post.

The lower end of the said brake-staff 59 is connected to the usual "worm" or other common form of steering-gear 60, having a rocking lateral horizontal arm 61, which extends outwardly through an opening in the car sill or frame 7, and has fixed upon its outer end one arm of an L-shaped bar 62, the opposite arm of which extends inwardly beneath said frame and has attached to it one end of a common chain 63.

Instead of the chain 63, I may of course, use a wire cable.

The opposite end of said chain 63, is connected to a coupling link 64 of a pair of brake-levers 65, the outer ends of which are pivoted at 66 to the front brake-beam 67 at a point adjacent the brake-shoes 68 of said brake-beam.

Figure 5:
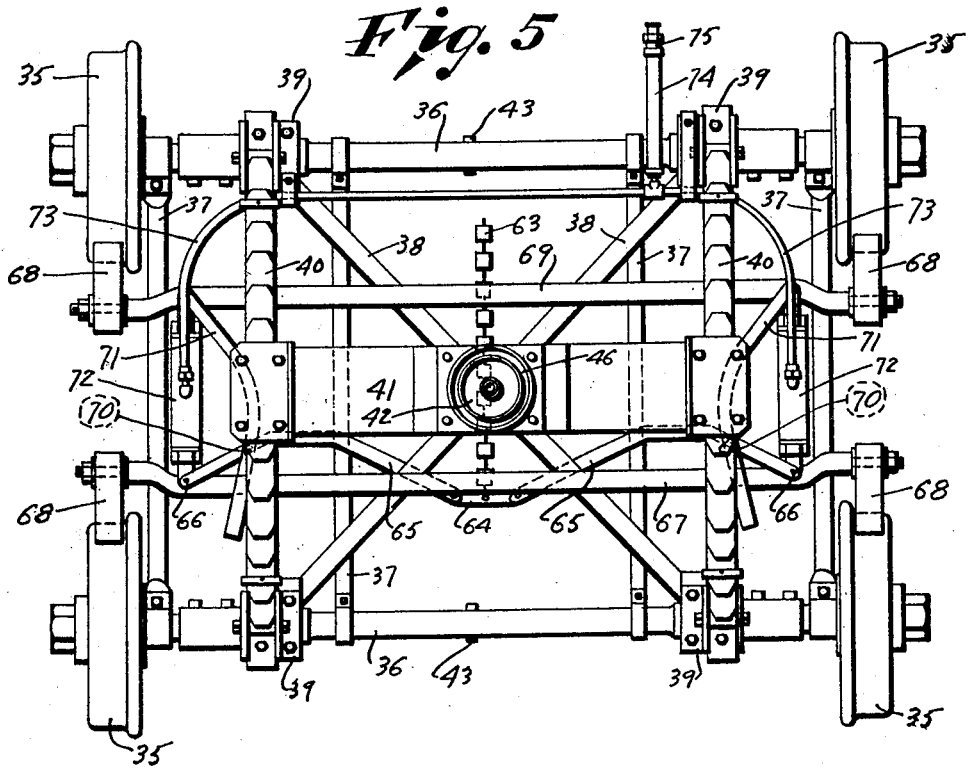
Fig. 5 is a top plan view of the front four-wheel truck detached from the car.
Figure 6:
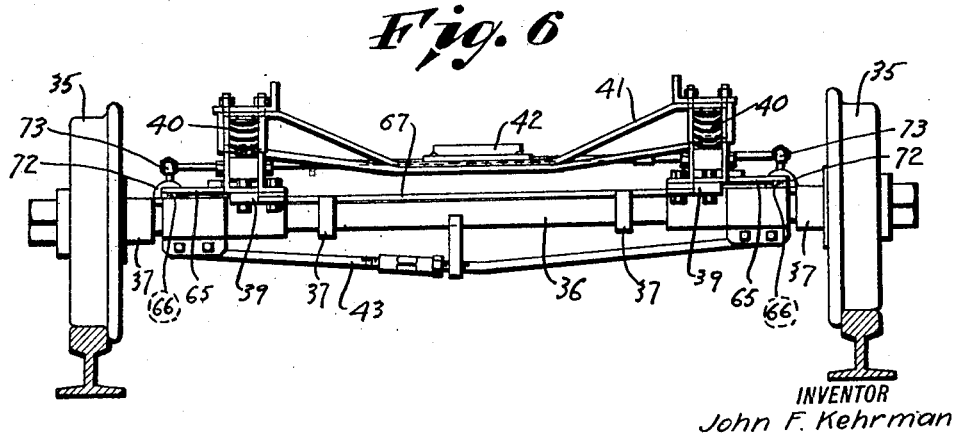
Fig. 6 is an end elevation of the truck shown in Fig. 5.
Figure 10:
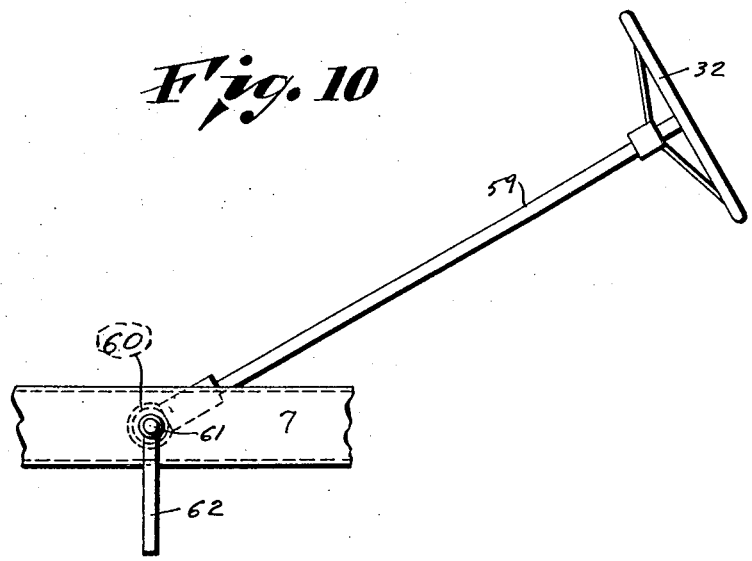
Fig. 10 is a detail side elevation of the hand-brake wheel and its mounting.
Figure 11:
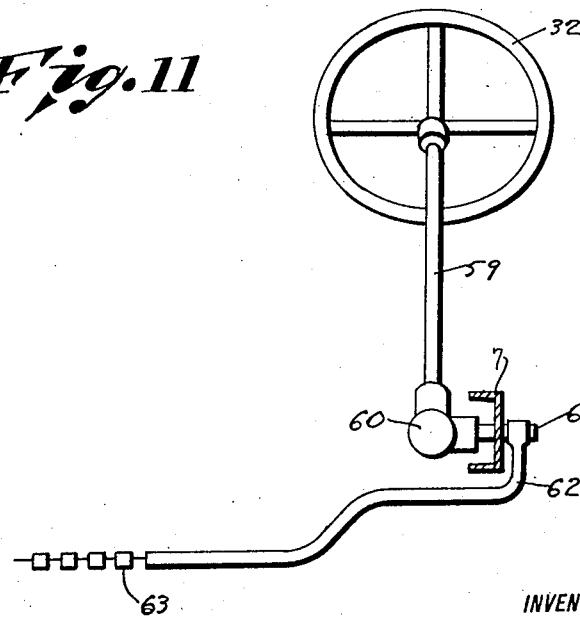
Fig. 11 is a detail front view of same.

The numeral 69 designates the rear brake-beam of the front truck, also having brake-shoes 68, and all of said brake-shoes are adapted to be simultaneously forced into contact with the truck wheels 35 by a pull upon said chain 63, said brake-levers 65 being fulcrumed at 70 to push-rods 71, the rear ends of which are pivotally connected to the rear brake-beam 69 at a point adjacent to the brake-shoes of said rear brake-beam. (See Fig. 5.)

Two double ended brake-cylinders 72 are each provided with two common opposed pistons, and one of said cylinders is mounted horizontally between the two brake-beams 67 and 69 adjacent the said brake-shoes 68, and the piston-rods of said pistons are pivotally connected to the said beams, to simultaneously force the said beams apart and carry said brake-shoes 68 into contact with the said brake-wheels 35.

Compressed air is forced into the said cylinders 72, to force said pistons outwardly, the air being supplied by pipes 73, flexible hose 74, and coupling 75, which latter is connected in the usual manner to the air reservoirs 20 by means of a common pipe 76.

Figure 3:
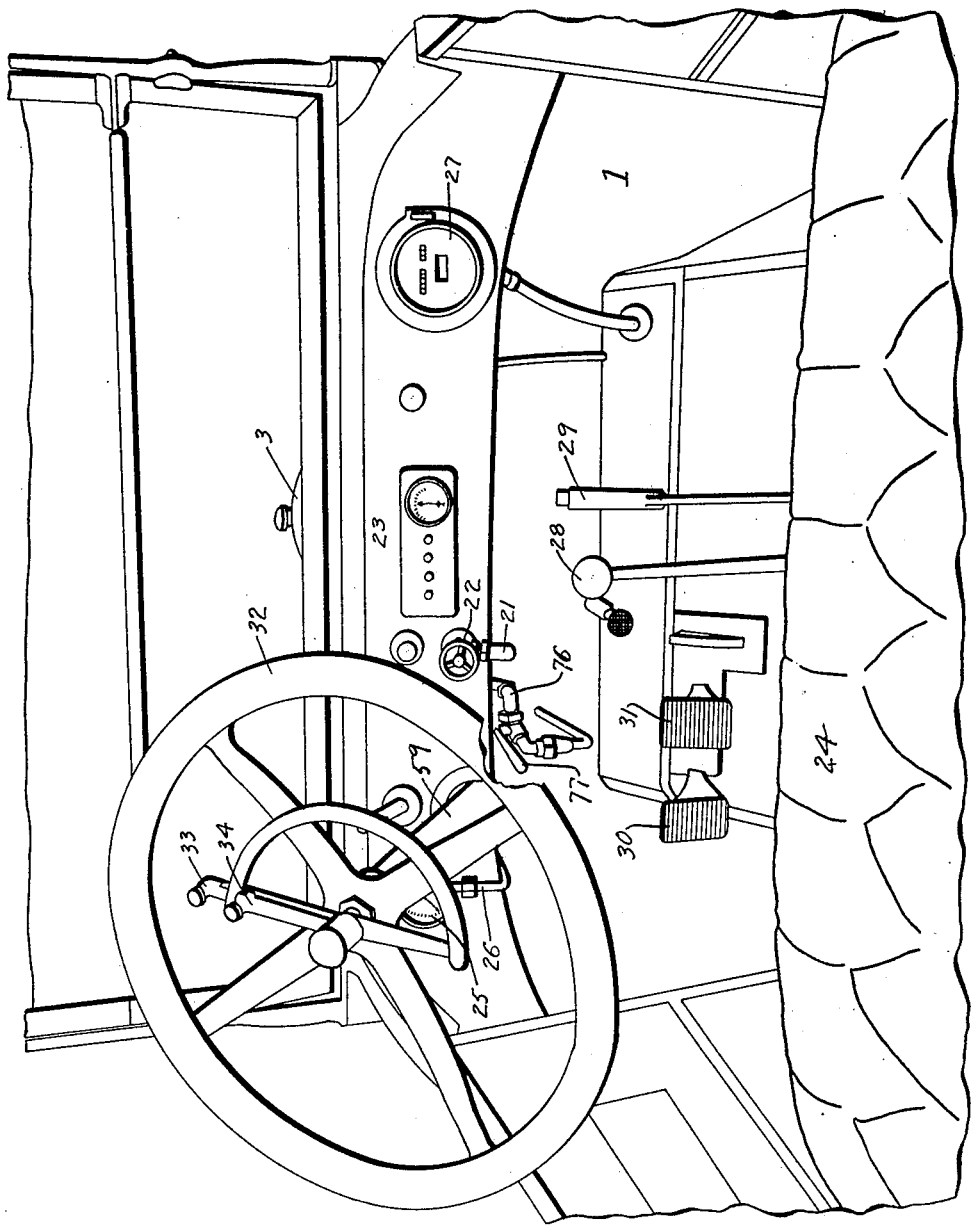
Fig. 3 is a perspective view of the interior of the car, showing the hand-wheel which operates the hand-brakes and also illustrating other control devices.

The passage of the air from said reservoirs to said cylinders is controlled by a common brake-valve 77, located on the dash under the cowl 23 of the car. (See Fig. 3).

The same air pipes 73 are used for supplying air to the said brake-cylinders 72, and for exhausting the air therefrom, such operation being, of course, controlled by the said brake-valve 77.

Figure 4:
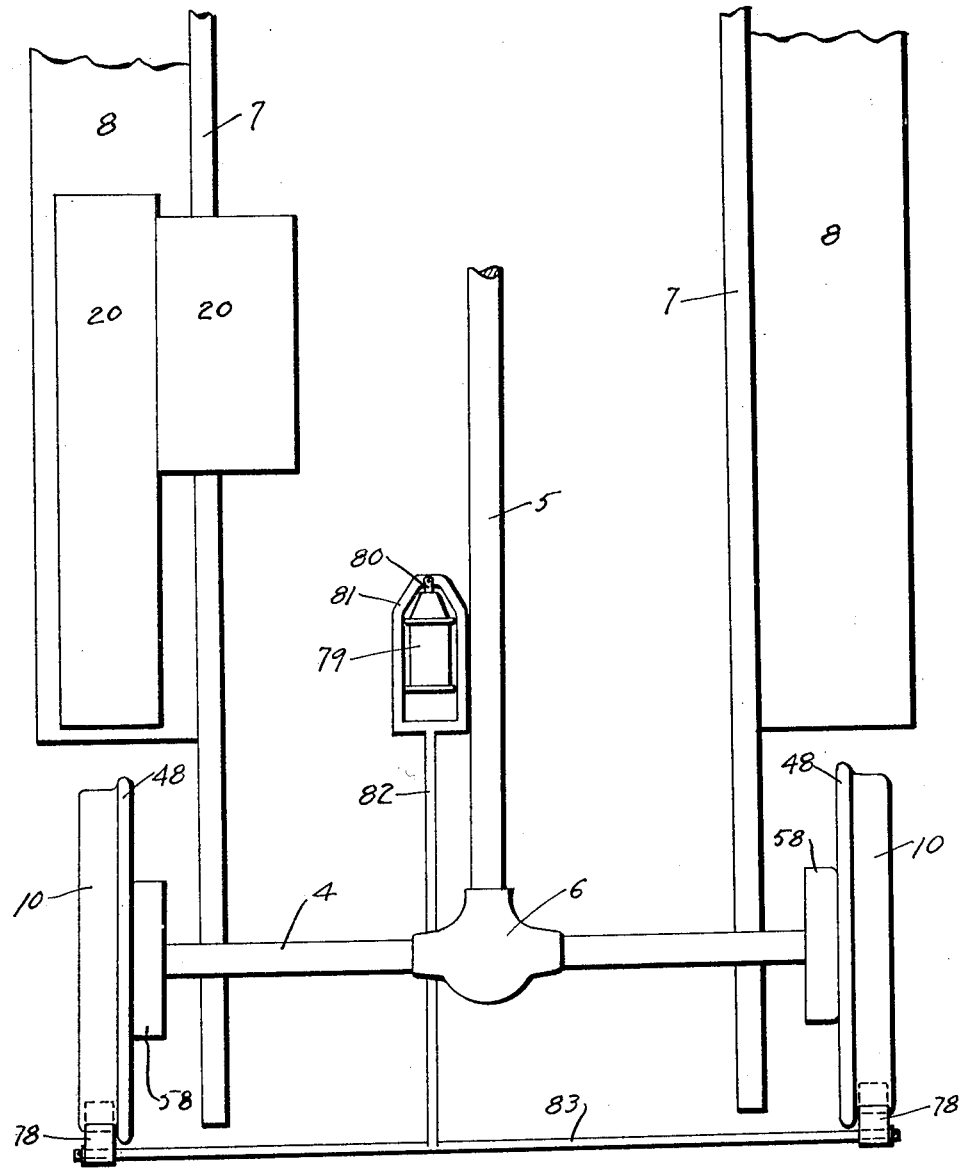
Fig. 4 is a fragmentary diagrammatic plan view illustrating the air-brake installation.

The same brake-valve 77 also controls the movement of the drive-wheel brake-shoes 78, as I provide a common brake-cylinder 79 the piston rod 80, which is connected to the yoke 81, having a connection 82 with the drive-wheel brake-beam 83. (See Fig. 4).

Figure 2:
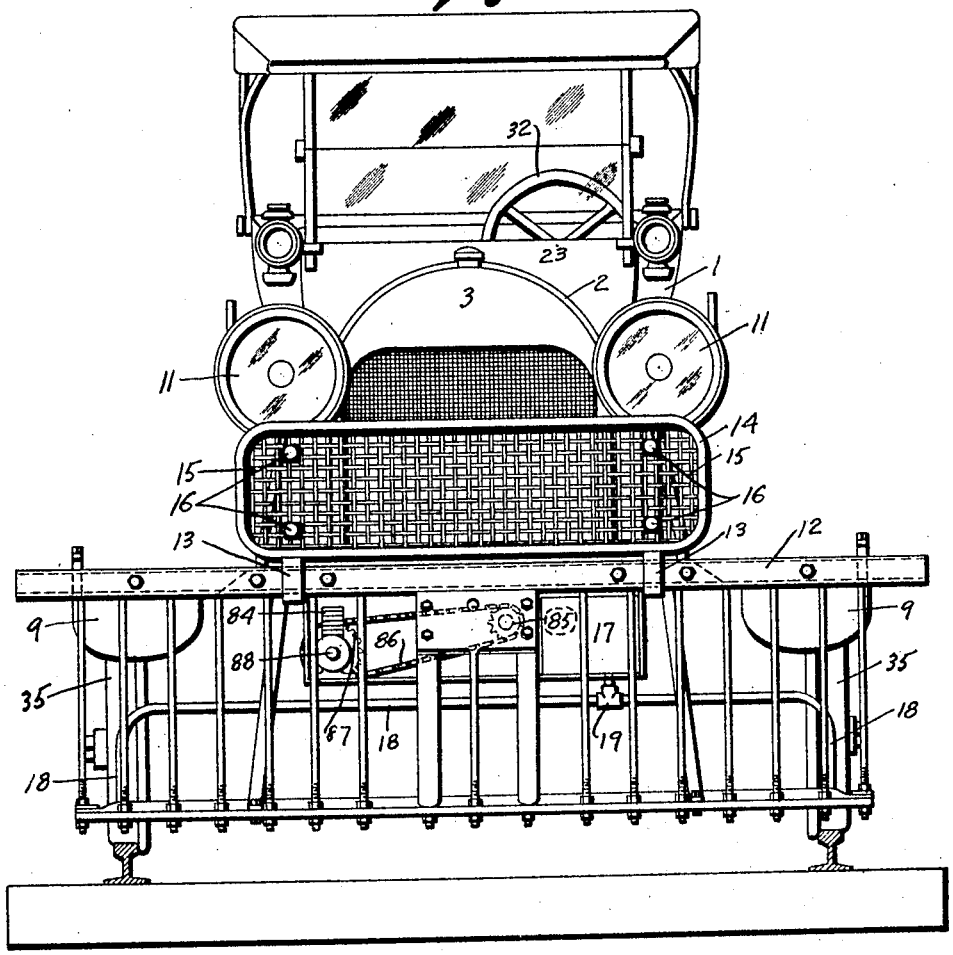
Fig. 2 is an elevation of the front end of the same.

An abundant supply of compressed air is furnished by an ordinary air-pump or compressor 84, which is connected to the said reservoirs 20 by means of common tubing or pipes, and which may be driven by the engine crank-shaft 85 direct, or it may be driven as here shown by means of a common sprocket-chain 86 running upon a pinion carried by said crank-shaft, and engaging a sprocket-wheel 87 mounted upon the crank-shaft 88 of the said air-pump. (See Fig. 2).

Or, the said air-pump may be driven by common toothed gearing connecting the crank-shaft of the air-pump with the crank-shaft of the engine.

The car may be fitted with the usual whistle and horn, and may also have a bell for the usual purpose.

The operation.

The operation of my improved railway motor-car will be clear from the above description, without further explanation.

It is imperative in operating my railway motor-car that both power and hand-brakes be applied to all wheels of the car, in order to make a quick stop in an emergency.

This car, if fitted with a modern high-powered automobile engine, will easily make 75 miles per hour, and will run with safety around comparatively short curves in the track.

I claim the following as my invention:—

1. A railway motor-car constructed with a separate non-driving swiveling front-truck having flanged wheels; rear flanged driving-wheels; and a power-plant composed of a combustion motor mounted directly above said truck on the car-frame, and the positively-driven toothed-gear power-transmitting and speed-changing devices of a conventional automobile; in combination with the usual control-devices of the latter.

2. A railway motor-car constructed with rear flanged driving-wheels for engaging the rails of a railway-track; a separate non-driving front truck pivotally connected to the frame of the car and having four flanged wheels; and a power-plant composed of a combustion motor mounted above said truck on the car frame and supported by the latter at the front end of the car; and the positively-driven toothed-gear power-transmitting and speed-changing devices of the conventional automobile type; in combination with the usual control devices.

3. A railway motor-car having flanged drive-wheels for engaging the rails of a railway-track, a power-plant therefor composed of the motor and power-transmitting devices of a conventional automobile, and opposite front guide-wheels mounted to revolve upon fixed axles and a frame which is pivotally connected with the frame of the car, and is supported by said axles.

4. A railway motor-car having flanged drive-wheels for engaging the rails of a railway-track, a power-plant therefor composed of the motor and power-transmitting devices of a conventional automobile, and a four-wheel guiding front truck having all of its wheels loose on fixed axles, and its frame pivotally connected to the frame of the car.

5. The herein-described method of converting a conventional internal-combustion automobile into a railway motor-car; which consists in substituting flanged rear drive-wheels for the rear drive wheels of the automobile; and substituting for the steering-wheels and front steering-axle of the said automobile at a point directly beneath the internal-combustion motor a front truck that is swiveled to the frame of the car and provided with four flanged guide-wheels.

6. In a railway motor-car supported upon flanged wheels, the combination of a body-frame or chassis, a suitable motor, flanged drive-wheels, a four-wheel truck having a frame, fixed axles which support said frame, the wheels of said four-wheel truck being loose on said axles, a center-bearing which pivotally connects the said frame to the front end of said body-frame or chassis, brake-shoes mounted between the alined wheels of said truck, and fluid pressure brake-cylinders having pistons arranged to simultaneously force said brake-shoes apart and carry the same into contact with the treads of said brake-wheels.

In testimony whereof I have signed my name to this specification in the presence of two subscribing witnesses.

JOHN F. KEHRMAN.

Witnesses:
FRANCES HOOVER ROSENBAUM,
JOHN C. HIGDON.